Sept. 24, 1940.  N. L. ETTEN  2,215,639
WRINGER
Filed June 19, 1936  6 Sheets-Sheet 1
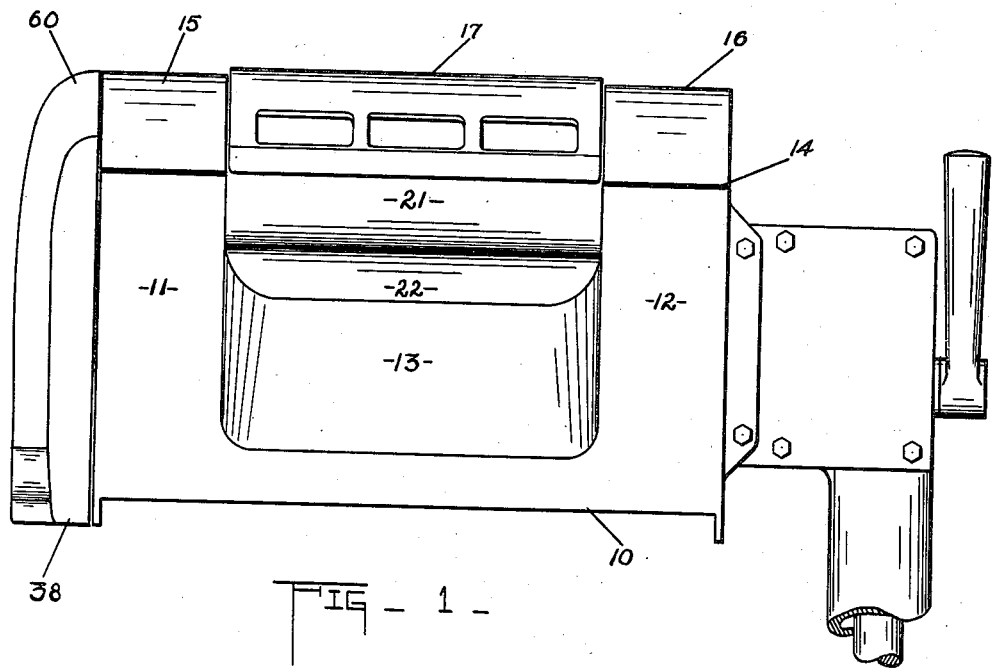
FIG - 1 -
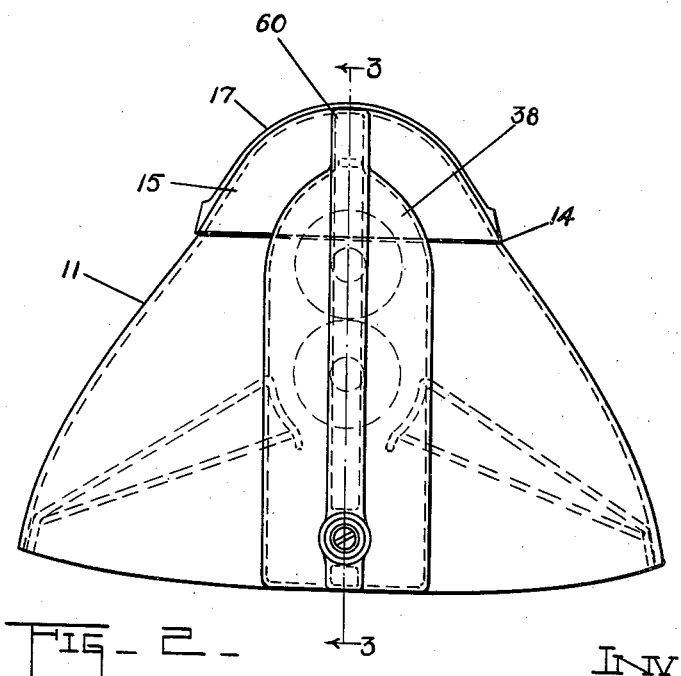
FIG - 2 -
INVENTOR
Nicholas T Etten
BY Pefft & Pefft
ATTORNEYS Sept. 24, 1940.　　　　　N. L. ETTEN　　　　　2,215,639
WRINGER
Filed June 19, 1936　　　　6 Sheets-Sheet 2
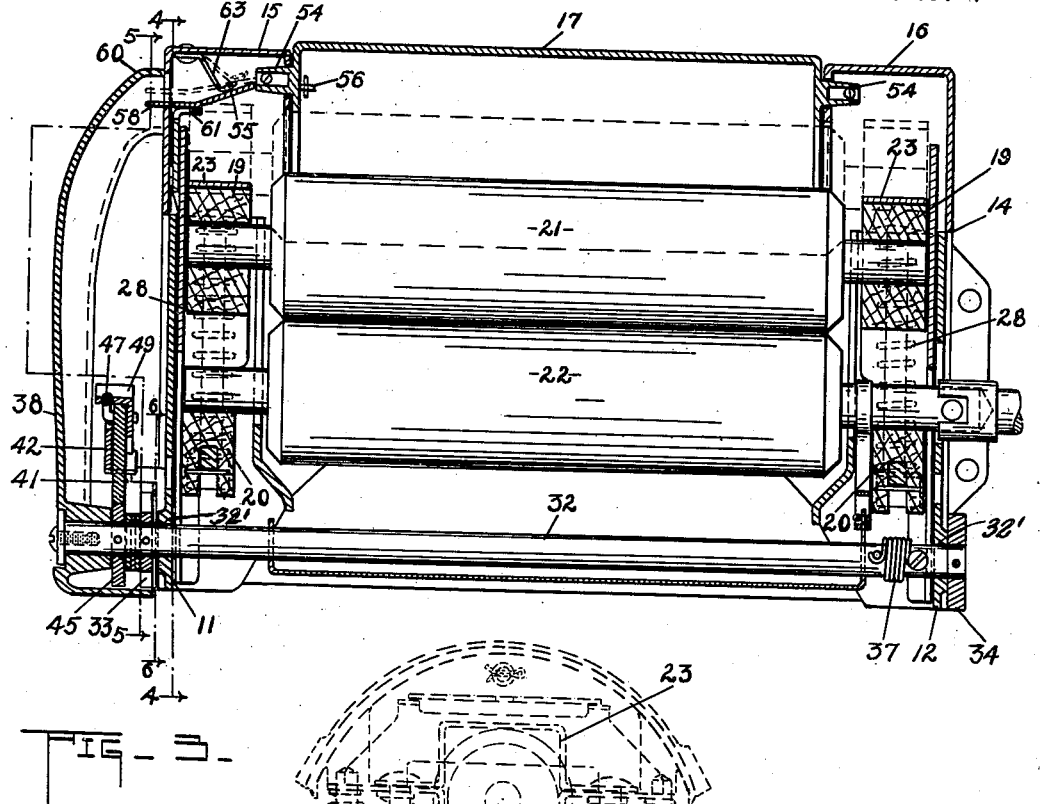
FIG-3-
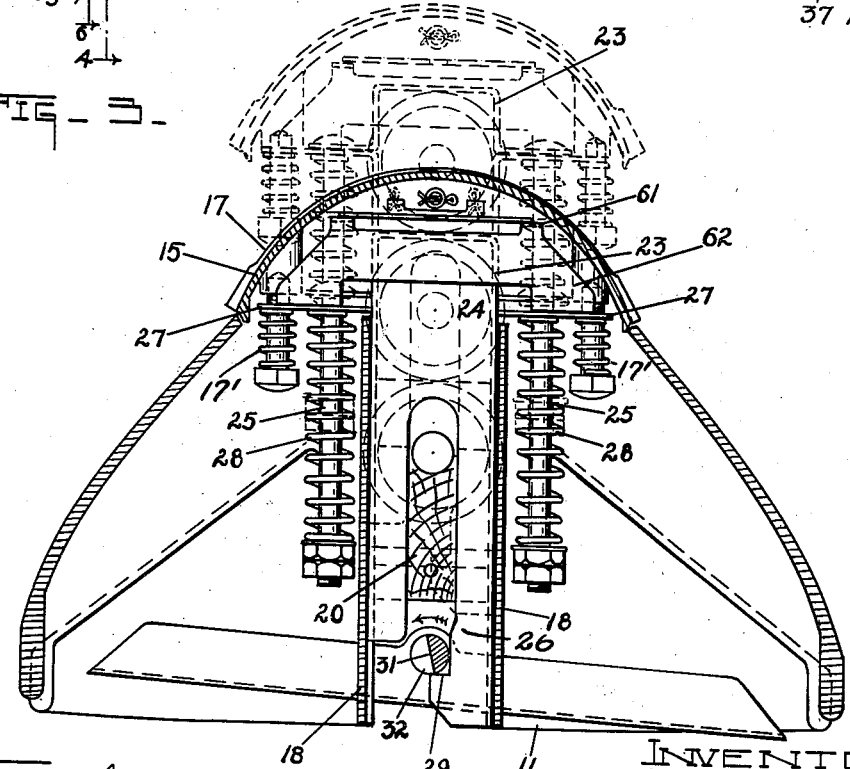
FIG-4-
INVENTOR
Nicholas L Etten
BY Pfafft & Pfafft
ATTORNEYS Sept. 24, 1940.                N. L. ETTEN                2,215,639
                                 WRINGER
                            Filed June 19, 1936            6 Sheets-Sheet 3
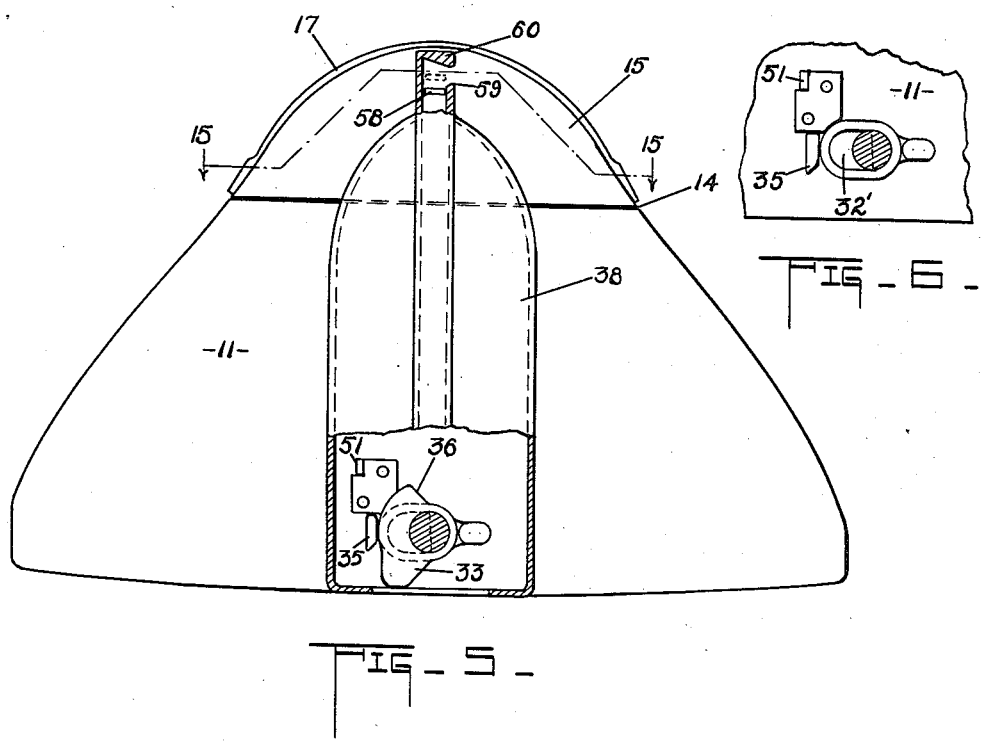
FIG-5-    FIG-6-
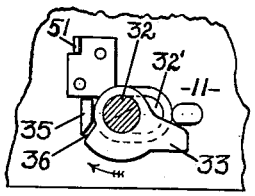 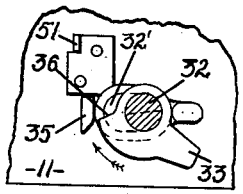 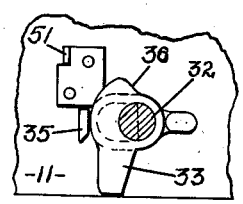
FIG-7-    FIG-8-    FIG-9-
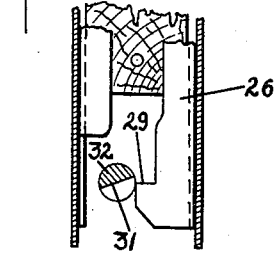 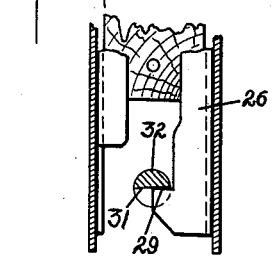 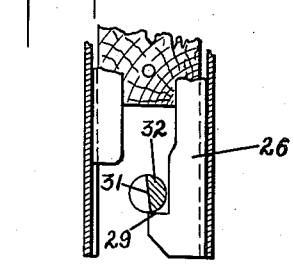
FIG-10-   FIG-11-   FIG-12-
INVENTOR
Nicholas L Etten
BY Pefft & Pefft
ATTORNEYS

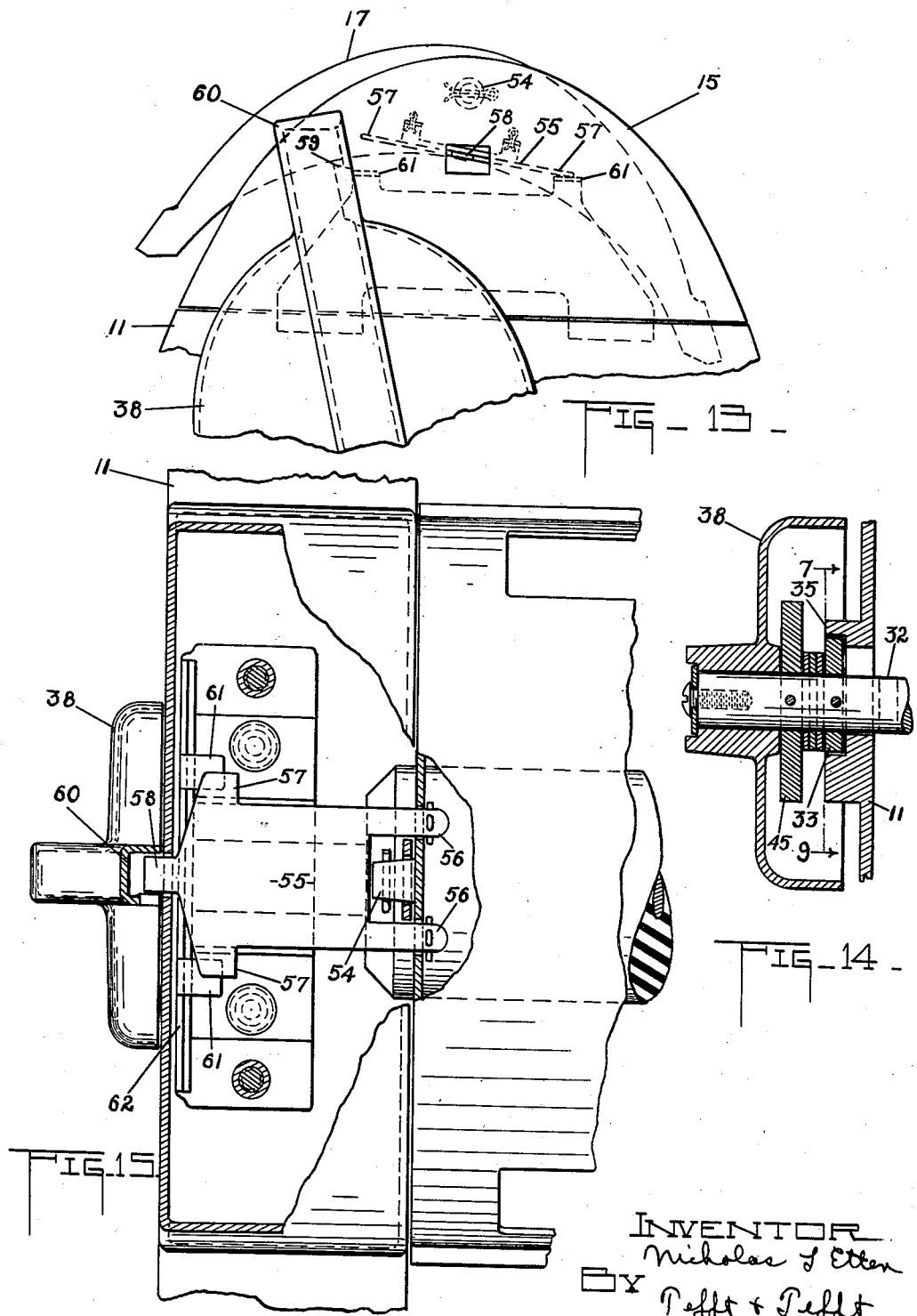

Sept. 24, 1940.   N. L. ETTEN   2,215,639
WRINGER
Filed June 19, 1936   6 Sheets-Sheet 5

INVENTOR
Nicholas L. Etten
BY Pefflt & Pefflt
ATTORNEYS

Sept. 24, 1940.  N. L. ETTEN  2,215,639
WRINGER
Filed June 19, 1936  6 Sheets-Sheet 6
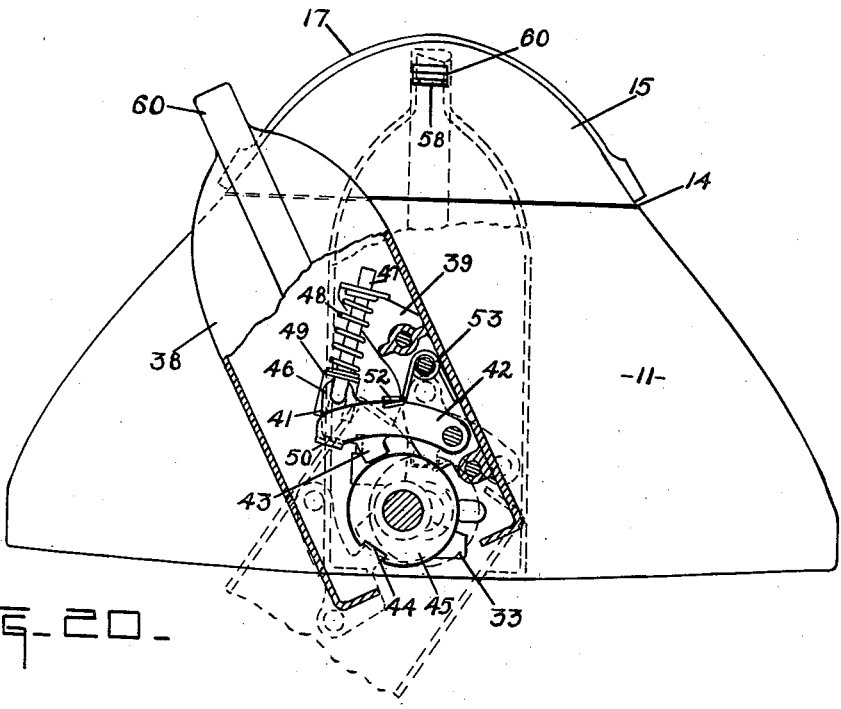
FIG-20-
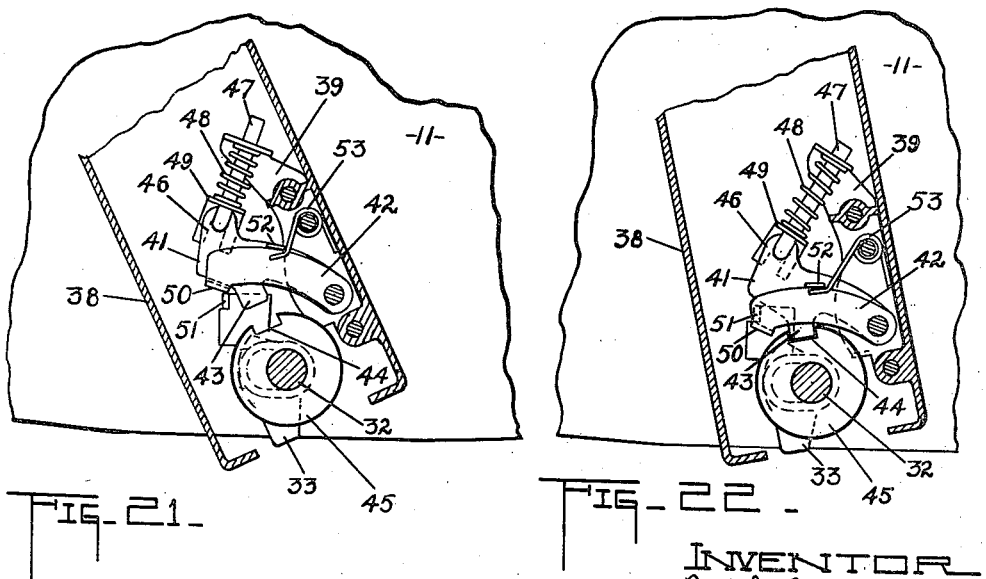
FIG-21-  FIG-22-
INVENTOR
Nicholas L Etten
BY Pefft & Pefft
ATTORNEYS Patented Sept. 24, 1940

2,215,639

UNITED STATES PATENT OFFICE 2,215,639

WRINGER

Nicholas L. Etten, Waterloo, Iowa

Application June 19, 1936, Serial No. 86,093

4 Claims. (Cl. 68—263)

My invention is directed to a wringer mechanism, particularly to a mechanism for holding the wringer rolls in pressure relation, releasing the pressure, and for restoring the pressure subsequent to release.

The principal object of the invention is to provide a wringer mechanism having, in combination, a pair of rolls, pressure mechanism for the rolls, a releasable mechanism for actuating the pressure mechanism and novel manual means for actuating the latter mechanism to apply pressure on the rolls.

Another object is to provide a release mechanism including a handle, which after a release operation, may be manipulated to reset the pressure mechanism.

A further object is to provide a handle as aforesaid which is manually moved to a latched position to place the wringer rolls in pressure relation, there being means to disable the latch means to release the pressure, whereupon the handle may be manipulated to restore the pressure while being moved to said latched position.

Other and additional objects will appear in the following description when read in reference to the accompanying drawings in which:

Fig. 1 is a side elevational view of a wringer embodying my invention;

Fig. 2 is an end elevational view showing the same as seen from the left in Fig. 1;

Fig. 3 is a sectional side elevational view taken from line 3—3 in Fig. 2;

Fig. 4 is a sectional end elevational view taken from line 4—4 in Fig. 3;

Fig. 5 is an end elevational view taken from line 5—5 in Fig. 3;

Fig. 6 is a fragmental sectional view taken from line 6—6 in Fig. 3;

Figs. 7 to 9 are fragmental sectional detail views taken on line 7—9 in Fig. 14;

Figs. 10 to 12 are fragmental sectional elevational views taken on the lower part of line 4—4 in Fig. 3;

Fig. 13 is an enlarged fragmental and elevational view showing parts in operated position as will be described;

Fig. 14 is a sectional plan view taken on line 14—14 in Fig. 19;

Fig. 15 is an enlarged fragmental plan view taken on line 15—15 in Fig. 5;

Figs. 16 and 17 are respectively side and edge elevational views of a part of the mechanism to be referred to;

Fig. 20 is an elevational view showing the parts of Fig. 18, as the same are associated with a wringer; and Figs. 21 and 22 are fragmental detail views showing parts illustrated in Fig. 18 in operative cycle position.

Figure 16:
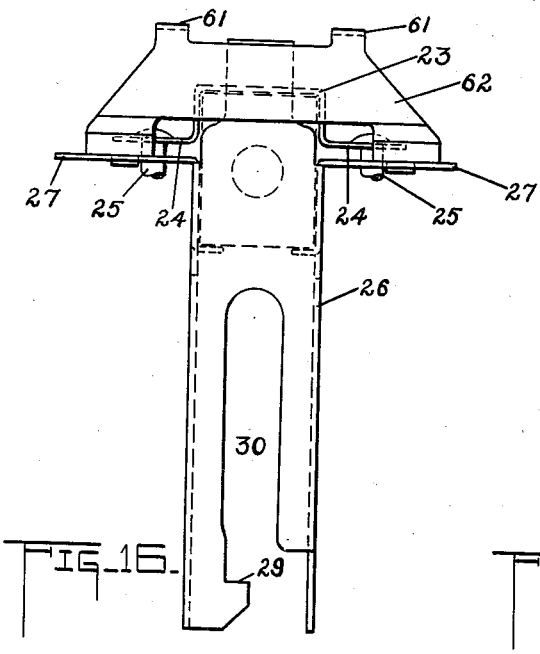

Before proceeding with the description it is to be noted that the particular wringer mechanism herein shown is not a necessary part of my present invention and will therefore not be described in great detail. The invention is principally directed to means for actuating and controlling the pressure mechanism of the wringer. During the perusal of the description it will become apparent that my invention may be modified so as to be used in connection with many well known types of wringers. It is to be understood that the present wringer is shown for illustrative purposes only.

Figs. 1 and 2 are side and end elevational views respectively of a wringer embodying my invention. 10 designates a lower frame structure which includes, preferably in one piece, upright end portions 11 and 12 and apron portions 13 extending between them. As indicated in Fig. 2, the end portions are spread outwardly at the bottom, giving an enlarged base form and the sides of the end portions converge toward the top and are cut off at the line 14.

Resting upon each of the end portions is a cap structure 15 and 16 and between the caps, and pivotally supported thereby, is a manually accessible rocking release actuating member 17 which will be referred to shortly.

The frame 10 is of hollow construction and on the inside of walls of the end portions are guide portions 18, Fig. 4, forming channels which confine bearing blocks 19 and 20 in which are journalled the shafts of upper and lower wringer rolls 21 and 22.

The lower bearings 20 are relatively fixed in the frame and the upper blocks 19 are made slidable in the channels whereby the upper roll 21 is movable toward or away from the lower roll as will be obvious.

To hold the upper roll in resilient pressure relation with the lower roll, I provide a pressure mechanism at both ends of the roll consisting of cross members 23 having middle portions extending across the tops and downwardly along the sides of the blocks.

Figure 17:
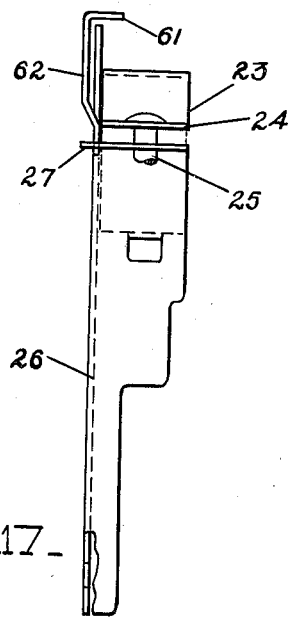

Figs. 4, 16 and 17 illustrate that the cross members 23 have outwardly extending portions

24 upon which rest the heads of bolt members 25. Disposed below members 23 are frame members 26, the body portions of which extend downwardly and are made slidable in the channels which confine the bearing blocks. At the tops of the members are outwardly extending portions 27 lying just below the portions 24 of members 23. The bolts 25 pass through the portions 27 as shown.

Confined on the bolts, between the portions 27 and affixed nuts, are coil springs 28 which react to push the bolts down with respect to portions 27 with the bolt heads urging members 23 toward members 27 and roll 21 toward roll 22.

To make the pressure mechanism effective, that is, to hold the members 26 in a lowered position so as to compress the springs 28, I provide a mechanism including cam surfaces or hooks 29. The hooks are formed near the lower ends of slots 30 in members 26.

Figure 19:
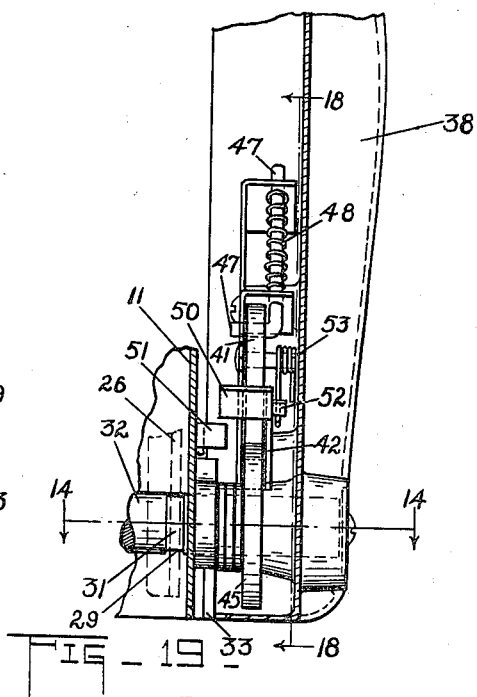
Fig. 19 is a side elevational view taken from line 19—19 in Fig. 18.

Cooperative with the hooks are cams 31 formed on a shaft 32. Shaft 32 lies longitudinally of the wringer frame and is journalled in bearing slots 32' in the end portions thereof as shown in Fig. 3. The cams 31 are preferably formed by milling out flat-bottomed slots in shaft 32 in position to engage hooks 29, as indicated in Figs. 4 and 19.

Hooks 29, in each of members 26, extend in the same direction and the cams 31 are made to cooperate with the hooks in the following manner;

Referring to Figs. 3 and 6 to 12 it will be noted that shaft 32 carries affixed cam members 33 and 34 disposed just outside the walls of end frame portions 11 and 12 respectively. Since the cams are similar in form and function, only cam 33 will be described.

It has already been noted that shaft 32 is journalled in bearing slots 32' in the frames 11 and 12. The shaft is obviously free to slide at will or rotate in the slots 32'. A lug 35 projecting from frame structure 11 is disposed to be engaged by the lobe 36 of cam 33 when the shaft 32 is rotated in the direction of the arrow in Fig. 7. Fig. 8 indicates that during rotation of the shaft the cam and shaft are moved toward the right, this movement being brought about by the cam lobe 36. At the end of the rotative movement the parts lie in the position shown in Fig. 9.

Figs. 10, 11 and 12 show the positions assumed by cam 31 with respect to hook 29 when shaft 32 is positioned as shown in Figs. 7, 8, and 9 respectively. Figs. 7 and 10 show the released position, wherein member 26 is in elevated position and springs 28 are relaxed.

Figs. 8 and 11 show the shaft 32 rotated to the position where it is disposed at the right hand end of the slot 32' and cam 31 is correspondingly placed over hook 29. Figs. 9 and 12 indicate the locked position, wherein cam 31 has been rotated so as to engage hook 29 and force the member 26 into lowered position corresponding to pressure relation of roll 21 on roll 22.

It will be noted in Figs. 4 and 12 that cam 31 is placed in a slightly negative position, that is, it rests somewhat short of a dead center alignment with respect to the line of movement of hook 29. Due to this arrangement, when in the position shown, the cam 31 and hook 29 are not in an inherently locked or stable latch relation or, in other words are biased to a position of automatic release. A part of the pressure of springs 28 is obviously available to force reverse rotation of shaft 32 and thus, if shaft 32 were rotated from the position of Fig. 8 to that of Fig. 12 and released it would immediately be rerotated to the released position of Fig. 10. When it is found necessary, I provide an auxiliary means for causing a positive or reverse or releasing rotation of shaft. This means may have the form of a spring 37 which is tensioned in the obvious manner.

Figure 18:
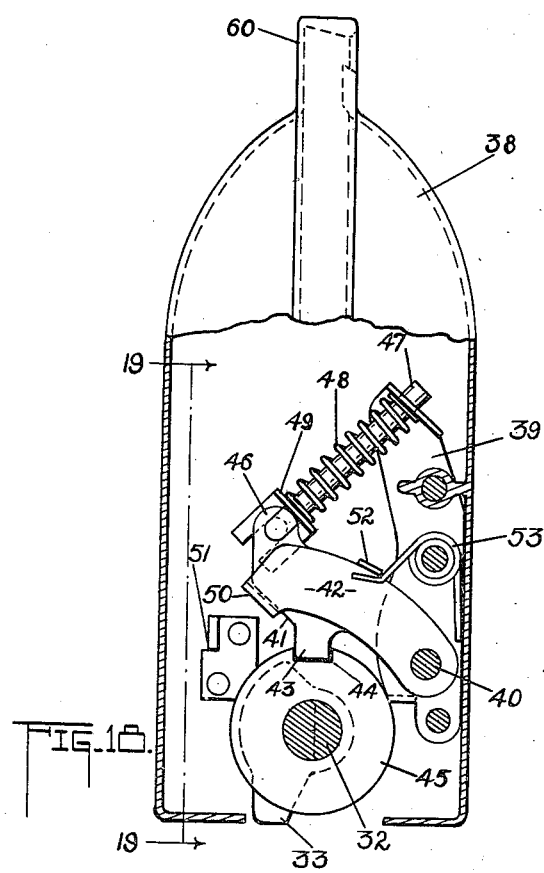
Fig. 18 is an elevational view taken on line 18—18 in Fig. 19.

To actuate the shaft 32 as above described to latch or lock the parts in tension relationship I provide a handle member 38 which is rotatably mounted on the extending end of shaft 32. The handle carries a mechanism for releasably connecting it with the shaft as follows:

Inside the outer wall of the handle, as best shown in Figs. 18 to 22 is secured a bracket structure 39, upon which are pivotally mounted at 40, two arms 41 and 42. The arm 41 has a tooth 43 extending from its lower side. The tooth is arranged to engage a notch 44 in the periphery of a disk 45 which is affixed to shaft 32, see Fig. 18. On its upper side the arm has an extension 46 connected to the right angle end of a rod 47, the upper end of which is slidably retained in an extending portion of bracket structure 39. A spring 48 is confined on rod 47 and reacts between bracket 39 and a slidable end piece 49 which rests upon the bent end of the rod as shown in Figs. 18 and 19 whereby the pressure of the spring is applied to urge the arm 41 downwardly so as to engage tooth 43 in notch 44.

The companion arm 42 lies alongside of arm 41 and has a bent over portion 50 which lies below arm 41 and extends therebeyond a sufficient distance to lie in the path of a lug 51 secured on frame portion 11. A lip 52 extends toward the opposite side of the arm and is engaged by a spring 53 which is mounted on bracket 39 and reacts to hold the arm up, with the portion 50, normally resting against the outer end of arm 41. It will be noted that with the parts in position of Fig. 18, spring 53 operates in opposition to spring 48. However spring 53 has only sufficient power to hold the arm 42, as described, and does not modify the action of spring 48 an unwanted extent.

The position of parts shown in Fig. 18 corresponds to the position of those shown in Figs. 9 and 12, or pressure position, wherein the tooth 43, being locked with disk 45 and shaft 32, with the handle 38 held in upright position, the wringer mechanism is tensioned for practical use.

To hold the handle 38 in the position shown I provide a latch mechanism operably connected with the rocking release member 17. This latter member has already been described as pivotally supported by cap members 15 and 16. The points of support are designated 54.

Figs. 3, 13 and 15 illustrate a plate member 55 having extending portions 56 which are movably confined in openings in the end wall of member 17. The plate further has ear portions 57 extending from each side and a latch extension 58 lying in the path of a lip 59 formed in a side wall of an upwardly extending portion 60 of handle 38. The extending portions 57 rest upon adjacent extending portions 61 of a fixture 62 secured to frame portion 11. A spring 63 urges the plate 55 downwardly to normally hold the ear portions 57 at rest against extensions 61, with latch 58 lying in lower position to engage lip 59 as shown in Fig. 5.

Referring to Fig. 13, it will be apparent that when member 17 is rocked upon pivots 54 the plate 55 is tilted to elevate one side whereby the latch extension 58 is elevated as shown to permit escapement of lip 59.

It will now become apparent that with the parts in position of Fig. 5, corresponding to Figs. 12 and 18, the wringer is in condition for practical use.

When it is desired to release the roll pressure the rocking member 17, held in normal level position by springs 17' is tilted whereby latch 58 is elevated and handle 38 is made free to move responsively to the described release rotation of shaft 32. The handle, thus moved substantially to the position shown in Fig. 20, carries its mechanism to the point where extension 50 of arm 41 engages lug 51 and continues to move arm 41 with it, until a point is reached where the tooth 43 is forced out of slot 44, thus releasing shaft 32 to complete its release movement to the position of Fig. 10, without further accompanying movement of handle 38. Thus, after a release operation, the handle is forced to approximately the position shown in Figs. 20 and 21 and remains in this position, it being supported against further movement by the portion 50 resting upon lug 51 as in Fig. 21.

To reset the tensioning mechanism, the handle 38 is manually moved toward the position shown in dotted lines in Fig. 20. During this movement the portion 50 is forced upwardly by the lug 51, carrying arm 41 with it, to a point where portion 50 escapes over lug 51 whereupon the tooth 43 is forced against the disk 45 by the spring 48.

Release rotation of shaft 32 obviously carries the slot 44 approximately to the position shown in Fig. 20 and when handle 38 is moved to the corresponding position the tooth engages the notch, whereupon the handle is returned toward the upright position, carrying shaft 32 toward pressure position.

During the return movement of the handle the portion 50 obviously engages under lug 51 and is forced around it and thus the mechanism is replaced without breaking the connection of tooth 43. Fig. 22 shows the operative position of arm 42 during return movement.

Continued return movement of the handle eventually places the parts in the locked relation shown in Figs. 5 and 12, in position to be released by a subsequent manipulation of member 17.

The reverse action of the mechanism will be well understood.

The foregoing description of the parts, together with the explanation of their functions discloses my wringer mechanism.

It will be appreciated that I have provided a novel pressure mechanism releasable by very easy and natural actions by the operator—either a push or pull on the prominent rocking cap member 17.

The pressure reset actuated by the reset lever 38 is a high leverage mechanism that is convenient and easy in action.

The structure shown is a preferred embodiment of my invention. However, I do not desire to be limited to the structure shown except as such limitation as is imposed by the following claims.

I now claim as new:

1. A pressure mechanism for a wringer having rolls comprising, means to press the rolls together, means for actuating the same to pressure position including a handle, means to hold the handle so as to hold the actuating means in pressure position, means for releasing said holding means to permit release movement of the actuating means and handle, and mechanism for disconnecting the handle from the actuating means during release movement thereof.

2. In a wringer, the combination of a frame, rolls in the frame, mechanism to press the rolls together, means for actuating the pressure mechanism to pressure position including a handle normally connected to the pressure mechanism, said handle being manually movable in one direction to establish pressure relation and movable in return direction responsively to reaction movement of the pressure mechanism, mechanism for connecting the handle with the pressure mechanism so as to enable an operator to actuate the pressure mechanism to pressure position by means of the handle, mechanism for holding the handle in pressure applying position, means to release said holding means whereby the handle is permitted to move responsively as aforesaid, and means automatically disconnecting the handle from the pressure mechanism during an initial release movement of the pressure mechanism, the handle being released from the pressure mechanism during continued reaction movement of the pressure mechanism.

3. In a wringer, the combination of a frame, rolls mounted in the frame, pressure mechanism for the rolls, means for actuating the pressure mechanism to render the same effective to press the rolls together consisting of a cam movably mounted in the frame below the rolls, means cooperatively connecting the pressure mechanism with said cam whereby to impose or release pressure from the rolls, a handle operatively connected with the cam which is manually movable in one direction to operate the cam to actuate the pressure mechanism to apply pressure to the rolls, a latch on said frame to hold the handle in pressure applying position, means on the latch for releasing said latch to permit return release movement of the handle and cam and means to disconnect the handle from said cam after initial release of the handle to permit continued release movement of the cam without accompanying movement of the handle.

4. In a wringer, the combination of a frame, rolls mounted in the frame, pressure mechanism for the rolls, means for actuating the pressure mechanism to press the rolls together comprising a cam movably mounted in the lower frame and cooperative with a part on the pressure mechanism for operating the latter, a handle mechanism connecting the handle with said cam for moving the cam unitarily therewith whereby the handle may be moved to move the cam to effect the application of pressure, the cam being normally biased to release position, means to hold the handle and hence the cam in pressure applying position, means to release the holding means, and means to disconnect said handle from the cam during release movement of the cam.

NICHOLAS L. ETTEN.